US006672044B1

United States Patent
Zehavi et al.

(10) Patent No.: US 6,672,044 B1
(45) Date of Patent: Jan. 6, 2004

(54) VIBRATION UNIT

(76) Inventors: Eitan Zehavi, 12 Alonim Str., 36000 Kiryat Tivon (IL); David Chiel, 21 Givat Hamore Str., 18750 Afula Illit (IL)

( * ) Notice: Subject to any disclaimer, the term of this patent is extended or adjusted under 35 U.S.C. 154(b) by 0 days.

(21) Appl. No.: 10/130,581

(22) PCT Filed: Nov. 5, 2000

(86) PCT No.: PCT/IL00/00716

§ 371 (c)(1),
(2), (4) Date: May 17, 2002

(87) PCT Pub. No.: WO01/35721

PCT Pub. Date: May 25, 2001

(30) Foreign Application Priority Data

Nov. 18, 1999 (IL) ................................................ 133027

(51) Int. Cl.[7] ............................................... A01D 46/00
(52) U.S. Cl. ..................................................... 56/340.1
(58) Field of Search ............................... 56/340.1, 328.1

(56) References Cited

U.S. PATENT DOCUMENTS

| 3,338,040 A | | 8/1967 | Shipley, Jr. | |
|---|---|---|---|---|
| 3,548,578 A | | 12/1970 | Shipley, Jr. | |
| 3,650,099 A | | 3/1972 | Sitter | |
| 3,656,283 A | * | 4/1972 | Shipley | .......................... 56/1 |
| 3,771,301 A | * | 11/1973 | Favor | .......................... 56/340.1 |
| 3,780,510 A | * | 12/1973 | Tompkins | .................... 56/340.1 |
| 4,194,347 A | * | 3/1980 | Peters | ......................... 56/340.1 |
| 4,409,782 A | * | 10/1983 | Westergaard et al. | ....... 56/340.1 |
| 4,893,459 A | * | 1/1990 | Orlando | ...................... 56/340.1 |
| 4,903,471 A | | 2/1990 | Bunnelle | |
| 5,473,875 A | | 12/1995 | Zehavi et al. | |
| 5,921,074 A | * | 7/1999 | Scott et al. | ..................... 56/330 |

OTHER PUBLICATIONS

Fluid Power Reference Issue, Machine Design, vol. 47, No. 22, Sep. 11, 1975, pp. 7, 150.

J.D. Whitney, G.H. Smerage, W.A. Block, "Dynamic Analysis of a Trunk Shaker–Post System" No. 001–2351/90/3304–1066, Transaction of the American Society of Agricultural Engineers, vol., 33, No. 4, pp. 1066–1071, 1990.

* cited by examiner

Primary Examiner—Thomas B. Will
Assistant Examiner—Nathan Mammer
(74) Attorney, Agent, or Firm—Frishauf, Holtz, Goodman & Chick, P.C.

(57) ABSTRACT

A vibration mechanism (300) for shaking a tree trunk held between two clamps, for an efficient harvest of the tree-fruits and for preventing damage to the tree-roots and to the tree trunk. The vibration unit comprises two counter-rotating rotors (R) weighted by displaceable weights (18, 19) and powered, preferably, by at least one hydraulic motor (M). A transmission (T) coupled to the motor and to the rotors, counter-rotates the rotors.

19 Claims, 3 Drawing Sheets

PRIOR ART

VIBRATION UNIT

This application is a U.S. National Phase Application Under 35 USC 371 of International Application PCT/IL00/00716 (published in English) filed Nov. 5, 2000.

TECHNICAL FIELD

The present invention relates to tree-shaking harvesting equipment, and in particular to the vibration generation unit which actuates such equipment.

BACKGROUND ART

Traditionally, picking fruit and nuts from trees was always done manually and was inherently labor intensive. With the rise of wages and the increase of competition in the food supply market, efforts were made to mechanize the harvesting of trees and to provide for methods that are more efficient. Because of this quest, tree-shaking machines were developed. Those tree shakers are equipped with a pair of two opposing clamps, which firmly engage a tree on two diametrical sides of the trunk. The tree shaker also comprises a vibration generation unit that is connected to the clamps of the tree-shaking machine. Once the clamps are engaged, the tree is shaken to remove the fruit, with the intent that the inertial forces that will develop on the fruit will exceed the bonding force between the fruit and the stem.

A vibration generation unit is typically driven by a dual oscillation mechanism, which operate substantially independently of one another. An example is provided in U.S. Pat. No. 3,338,040 which shakes the tree in a number of different random directions. Such action is undesirable, because some of these directions may cause damage to the tree. For example, those directions in which the clamps vibrate tangentially to the trunk cause transverse shear which can strip tree bark and abrade the stem. Furthermore, two randomly vibration generation units do sometimes oppose one another and cause energy dissipation; or excessively reinforce one another and thereby exert exaggerated compressive forces on the tree.

Efforts to coordinate the action of the two vibration generating units, such as modification of the moment of inertia of the spinning rotators resulted in U.S. Pat. Nos. 3,548,578 and 4,903,471. But even those improved devices wrench the trees across a range of directions at once, risking damage to the root system. Experiments were also conducted with the variation of the frequency of shaking, to reach the natural resonance frequency of the tree. It was thought that if it would be possible to reach the maximum amplitude of displacement, then the most efficient tree harvesting conditions would be s obtained. A limb shaker having a variable throttle arrangement that can be adjusted until the greatest displacement is observed is taught in U.S. Pat. No. 3,650,099. However, with a manual throttle setting device, the shaker was poorly suited for commercial harvesting.

In a paper of the American Society of Agricultural Engineers, by J. D. Whitney, G. H. Smerage and W. A. Block, No. 0001-2351/90/3304-1066, published in April 1990, there is mention of a shaking system with a three-shaft linear vibrator. As shown in FIG. 1, the elements of the system comprise a vibration unit A, a tree clamp C engaging a trunk B and part of the shaker machine D. The vibration unit A consists of three identical vertical sprocket wheels mounted side by side on a horizontal frame beam F inside a housing H. One sprocket wheel MS, the middle one for example, is driven by a motor M, not shown in FIG. 1 for the sake of clarity, and the other two sprocket wheels, on the sides of the driven sprocket wheel MS, are driven sprockets S. A chain CH couples the three sprocket wheels, with the slack side SS of the chain CH, running substantially in parallel and below the frame beam F. The slack side SS is tensioned by an idler ID. The two driven sprocket wheels S are engaged by the chain CH to rotate in the same direction while the middle driving sprocket MS counter-rotates. This is achieved by running the chain over both side sprocket wheels S but under the driven sprocket wheel MS.

To generate vibrations, the sprocket wheels carry eccentric weights. A single weight G is mounted eccentrically on each one of the sprocket wheels S while a double weight 2G is mounted with the same eccentricity on the driven sprocket wheel MS. With reference to FIG. 1, the single weights G and the double weight 2G are all aligned to the east, according to the directions of the compass card. A force vector equal to the sum of forces applied by the two single weights G and the one double weight 2G is thus applied eastwards.

Assuming that the driven sprocket wheel MS rotates anti-clockwise, then both sprocket wheels S will rotate clockwise. FIG. 2 now represents the s vibration unit A after a quarter of a turn of the sprocket wheels, according to the assumed direction of rotation. The single weights G on the sprocket wheels S now point northwards while the double weight 2G points southwards. The force vector of the sum of forces applied all the weights, namely, two single forces G pointing to the north and one double weight 2G directed to the south, now equals zero, and thereby, the upward and the downward forces cancel out.

Another quarter of turn of the sprocket wheels is depicted in FIG. 3. This time all the weights are aligned westwards. The resultant force vector is thus the same as at the start, as shown in FIG. 1, but in the opposite direction. One more quarter of a turn, not illustrated in a drawing, would result in a rotation of 180 degrees of all the sprocket wheels relative to FIG. 2, whereby the force vector would again sum up to zero. It has thus been shown that the vibration unit A is a linear shaker: theoretically, forces appear only horizontally, in the east to west direction, while no forces are generated vertically, north-south.

In practice however, the results are quite different. First, the vibration unit A is limited to rather slow rotational velocities, due to the chain drive, which makes it unfit for the harvesting of smaller fruit. Second, the vibration unit A develops severe wear and tear, resulting in costly maintenance expenses. Third, the vibration unit A engages the tree trunks with its longitudinal axis in the direction of shaking, thus rendering it very awkward to operate.

Although tree shakers are readily available, their vibration generating units still suffer from various drawbacks such as slippage, loss of rotational synchronization which causes deviation from a single shaking direction, as well as damage to tree trunks and overall low harvesting efficiency.

For the above-mentioned reasons, there is obviously a need for better vibration generating units that keep their synchronization, are cheap to maintain and operate, and are easy to use. Moreover, there is definitely a need for equipment which features high efficiency harvesting and is inexpensive to manufacture.

SUMMARY OF THE INVENTION

It is an object of the present invention to provide a vibration generation mechanism for the high efficiency harvesting of trees.

It is another object of the present invention to provide a vibration generation mechanism, which is simple to use and operate.

It is a further object of the present invention to provide a vibration generation mechanism that will not harm the trees during shaking.

It is yet another object of the present invention to provide a unitary improved but simple vibration generation mechanism featuring low costs of production, of operation and of maintenance.

Still another object of the present invention is to provide a vibration generation mechanism, which is reliable and long lasting.

It is an object of the present invention to provide a linear vibration generation mechanism for a tree trunk shaker, the shaker comprising a pair of clamps for locking on the trunk on opposite sides thereof and the linear vibration generation mechanism comprising:

- at least one motor for providing rotational motion at a predetermined angular velocity,
- a transmission coupled to the at least one motor, the transmission for providing a counter-rotating motion,
- a pair of identical eccentric rotators coupled to the provided counter-rotating motion, the pair of eccentric rotators rotating in parallel planes and at same angular velocity, and
- an enclosure for containing the linear vibration generation mechanism, the enclosure being associated with one clamp of the pair of clamps. The enclosure is possibly an integral part of one clamp of the pair of clamps.

It is another object of the present invention to provide a linear vibration mechanism, where the pair of eccentric rotators further comprises:

- at least one weight, and
- an arm having for releasably but fixedly supporting the at least one weight in adjustable position thereon, and the arm accommodates for the support of different at least one weight(s) and allows adjustment of the at least one weight(s) to achieve different identical eccentricity of the pair of eccentric rotators.

Another object of the present invention is to provide a way to define the direction of linear vibration by alignment of the at least one weight of each one of the pair of eccentric rotators in the desired direction of vibration.

Yet another object of the present invention is to allow a choice of motor from hydraulic motors, electric motors, internal combustion motors and pneumatic motors, or the selection of a motor built as a hydraulic motor of the gear-on-gear type, either with spur gears or with helical gears. It is also possible to have the at least one motor also serves as the transmission for providing counter-rotating motion. Evidently, the predetermined angular velocity of the motor is controllable.

Moreover, another object of the present invention is to provide a linear vibration mechanism wherein the at least one hydraulic motor comprises a modification of a conventional gear-on-gear oil pump into a hydraulic motor, wherein the conventional gear-on-gear oil pump comprises:

- a housing having a first side in parallel and opposite to a second side, the housing also comprising a third side opposite to a fourth side, the first side being perpendicular to the third side, the housing being sealed close, and the housing defining an inside and an outside,
- a first drive gear,
- a driven gear of the same size as the first drive gear, the first drive gear and the driven gear meshing side-by-side in counter-rotation inside the housing,
- a first driving shaft coextensive and coaxial with the first drive gear, the first driving shaft protruding outside of the first side of the housing in sealed engagement therewith,
- an oil inlet port located amid the third side, and
- an oil outlet port located amid the fourth side, and the at least one hydraulic motor comprises:

- the conventional gear-on-gear oil pump,
- a second drive gear,
- a second driving shaft, the second driving shaft and the second drive gear being of the same size as the first drive gear and the first driving shaft, the second drive gear meshing with the first drive gear in replacement of the driven gear, and the second driving shaft protruding outside of the second side of the housing in sealed engagement therewith, the first driving shaft and the second driving shaft being parallel to each other, whereby supply of oil under pressure to the oil inlet port counter-rotates the first drive gear in mesh with the second drive gear to counter-rotate the first driving shaft and the second driving shaft and thereby creating a hydraulic motor which also serves as the transmission for providing counter-rotating motion. The gears of the first drive gear and of the second drive gear are selected from the group consisting of spur gears and helical gears.

Furthermore, it is another object of the present invention to provide a vibration generation mechanism where the at least one motor further comprises:

- an output shaft, and the transmission further comprises:

- a housing comprising a first side and a second side, the second side being opposite to and in parallel with the first side, the housing defining an inside and an outside, the first side outside supporting the at least one motor with the output shalt thereof entering inside the housing through the first side and protruding outside of the second side,
- a first gear coupled to the output shaft inside the housing,
- a second gear of the same size as the first gear, the second gear and the first gear meshing side-by-side in counter-rotation inside the housing, and
- a driven shaft coextensive and coaxial with the second gear, the driven shaft exiting the housing and protruding outside the first side of the housing, and the output shaft being parallel to the driven shaft,
- the housing further accommodating bearings to support the output shaft, the first gear, the second gear and the driven shaft, whereby rotation of the at least one motor counter-rotates the output shaft relative to the driven shaft. The housing may be selected from the group consisting of an open housing, a closed housing and a sealed housing.

In addition, it is another object of the present invention to provide a vibration generation mechanism where the at least one motor further comprises:

- a first motor having a first output shaft and a second motor having a second output shaft, the first motor rotating in direction opposite to rotation direction of the second motor, and the housing further comprising:

- the first side outside supporting the first motor and the second side outside supporting the second motor, the first output shaft and the second output shaft penetrating from the side of their respective motor to inside the housing and protruding to the opposite side outside, the first output shaft and the second output shaft being parallel, and the first gear and the second gear being coupled, respectively, to the first output shaft and to the second output shaft. In this case, the first gear and the second gear synchronize rotation of the first motor and of the second motor.

It is another object of the present invention to provide that the at least one motor further comprises an output shaft, and the transmission comprises:

a housing of rectangular cross-section having a first side, a second side, a third side and a fourth side, the first side and the third side being opposite to and in parallel with, respectively, the second side and the fourth side, the sides of the housing defining a housing inside and a housing outside, with the first side outside supporting the at least one motor with the output shaft thereof penetrating inside the housing, a drive pinion coupled to the output shaft inside the housing, the drive pinion being a rotatably mounted bevel gear, a pair of coaxial parallel bevel gears meshing in perpendicular with the drive pinion, each one of the pair of bevel gears being rotatably located inside the housing, respectively on the third side and on the fourth side, a pair of coaxial driven shafts protruding outside the housing, each one of the pair of driven shafts being coupled to each one of the pair of parallel bevel gears, the output shaft and the pair of driven shafts residing in the same plane, whereby rotation of the output shaft drives the parallel bevel gears in counter-rotation, thereby counter-rotating the pair of driven shafts. The housing is selected from the group consisting of an open housing, a closed housing and a seated housing.

Still another object of the present invention is to provide a vibration generation mechanism where the at least one motor further comprises:

a first motor having a first output shaft and a second motor having a second output shaft, the first motor rotating in direction opposite to rotation direction of the second motor, the housing further comprising:
the first side outside supporting the first motor and the second side outside supporting the second motor,
the first output shaft and the second output shaft penetrating from the side of their respective motor to inside the housing,
a first drive pinion and a second drive pinion located inside the housing and coupled respectively, to the first output shaft and to the second output shaft, the first drive pinion and the second drive pinion being a rotatably mounted bevel gear,
a pair of coaxial parallel bevel gears meshing in perpendicular with the first drive pinion and a second drive pinion, each one of the pair of bevel gears being rotatably located inside the housing, respectively on the third side and on the fourth side,
a pair of coaxial driven shafts protruding outside the housing, each one of the pair of driven shafts being coupled to each one of the pair of parallel bevel gears, the first output shaft and the second output shaft and the pair of driven shafts residing in the same plane, whereby rotation of the output shaft drives the parallel bevel gears in counter-rotation, thereby counter-rotating the pair of driven shafts. In this case also, the first drive pinion and a second drive pinion and the pair of coaxial parallel bevel gears synchronize the rotation of the first motor and of the second motor.

BRIEF DESCRIPTION OF THE DRAWINGS

In order to better understand and more fully appreciate the invention and to see how the same may be carried out in practice, some preferred embodiments will now be described, by way of non-limiting example only, with reference to the accompanying drawing in which.

DETAILED DESCRIPTION OF PREFERRED EMBODIMENTS

Previous efforts of the present inventors have resulted in a past invention disclosed in U.S. Pat. No. 5,473,875, which is incorporated herewith by reference. There was presented a tree-shaking apparatus with a pair of two separate vibration generation units, each unit with an eccentric rotator and with sensors for sensing the instantaneous angular position of the eccentric rotator. In addition, the tree shaker comprised control means for rotating both eccentric rotators at a uniform rotational speed in opposite direction, which provided a predetermined shaking frequency. More control means coordinated the rotation of both eccentric rotators, in response to data provided by the position-sensing means, to keep the rotation in phase and thereby shake the tree along a single axis.

The intention was to provide for a tree shaker that would automatically select the optimal parameters of operation to maximize the efficiency of harvesting. This maximum efficiency was achieved by automatically matching of the frequency of tree shaker to the natural resonance of the tree, by choosing the best direction of shaking and by shaking the tree along a single axis. However, field tests proved that application of the procedure of automatic matching of parameters for tree after tree is too tedious and too time consuming. Test evidence further indicated that the trees of a same groove all exhibit approximately the same inherent characteristic response to shaking. It was thus concluded that it would be practical to provide for a shaker with one single linear vibration generation unit consisting of a sturdy, simple and reliable pair of counter-rotating eccentric rotators rotating at exactly the same rotation speed. Accordingly, details of the present invention will be supplied below.

Figure 1:
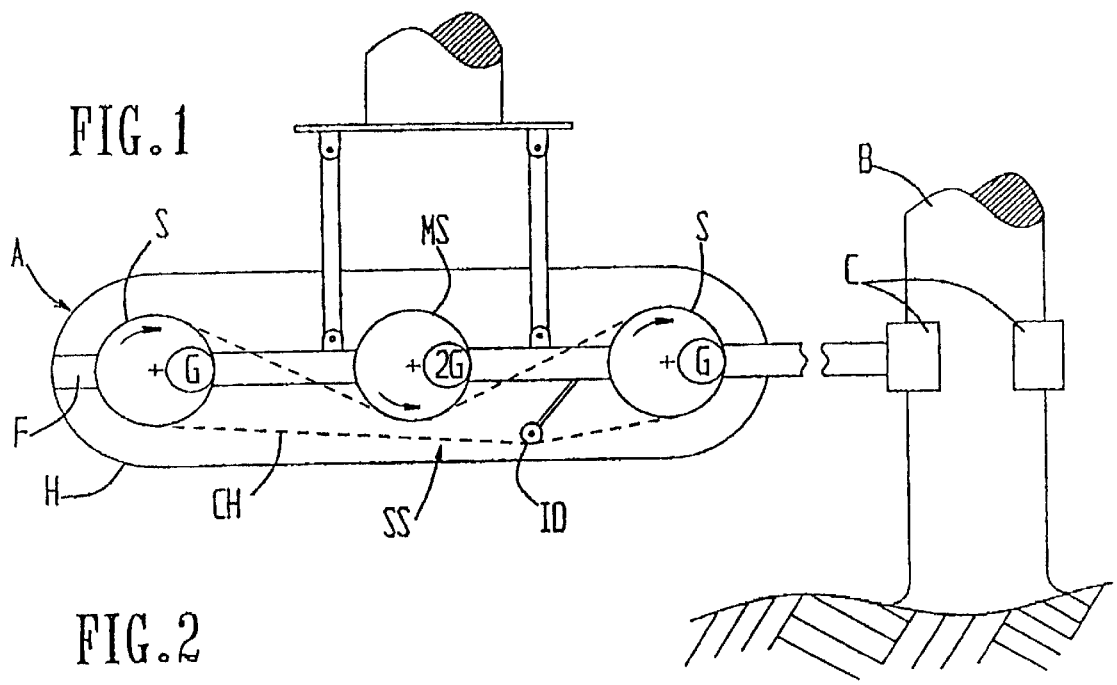
FIG. 1 is a schematic view of a prior art shaking system with a three-shaft linear vibrator.
Figure 2:
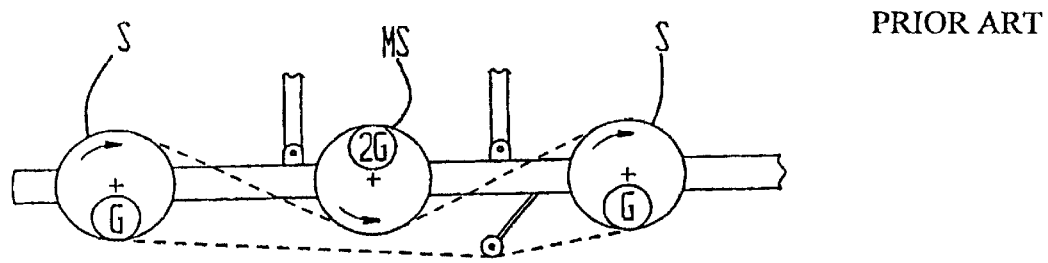
FIG. 2 is a detail of FIG. 1 after a quarter of turn rotation of a sprocket.
Figure 3:
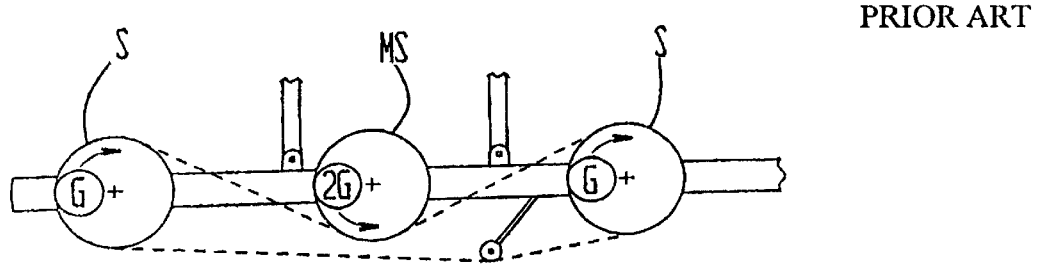
FIG. 3 shows the detail of FIG. 2 after another partial sprocket rotation.
Figure 4:
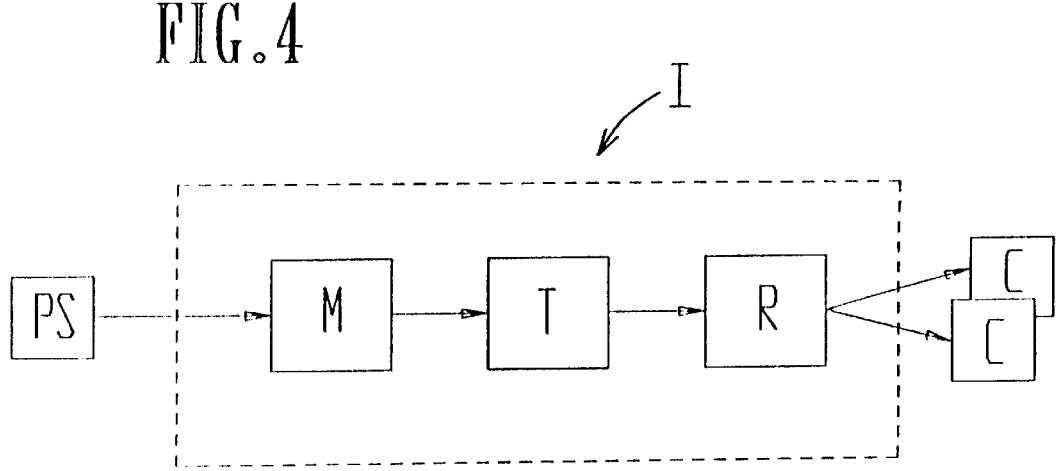
FIG. 4 is a block diagram displaying the elements of the present invention.

FIG. 4 presents the main elements of a linear vibration generation mechanism for a tree trunk shaker. In general, the vibration generation mechanism is composed of a motor M, for the provision of rotary motion, of a transmission T to produce counter-rotation and of a pair of eccentric rotators R, to generate vibrations. The motor M derives energy from a power supply PS and the output of the eccentric rotators R is coupled to a pair of clamps C, which clamp the tree trunk and impart vibrations thereto. FIG. 4 thus depicts an autonomous linear vibration generation mechanism with counter-rotating eccentric rotators for shaking tree trunks held in clamps. The vibration generation mechanism comprises the motor M, the transmission T and the pair of eccentric rotators R designated by the numeral I in FIG. 4.

Both clamps C transmit the vibrations from the vibration generation mechanism to the tree trunk. These clamps C are operated as a power system, which is separated from the vibration generation mechanism and will not be described, as they are not part of the present invention. The following description will be restricted to the vibration generation mechanism I of FIG. 4.

Figure 5:
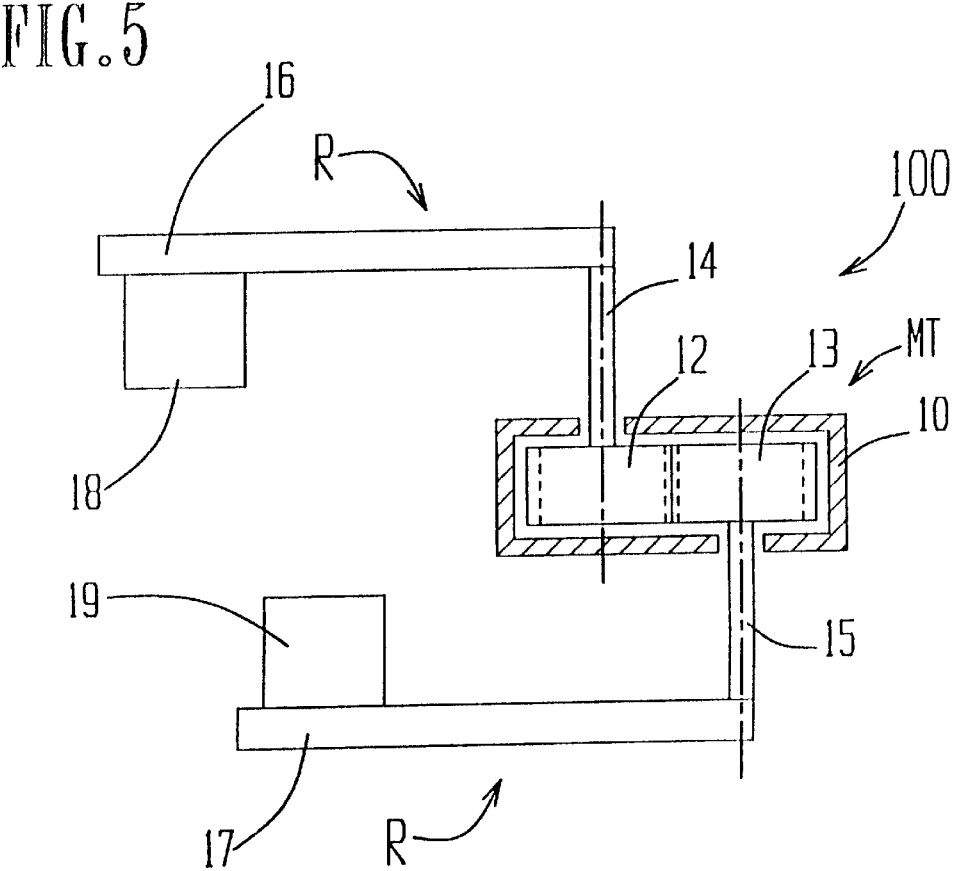
FIG. 5 shows a schematic of first embodiment of a vibration generation mechanism; in relation to the elements detailed in FIG. 4.

A first embodiment 100 of the vibration generation mechanism is shown in FIG. 5. The pair of eccentric rotators is designated as R, but the motor is indicated by MT, thus motor and transmission, because it serves the double purpose of providing for generation and transmission of rotation and also for outputting counter-rotation. The implementation of the motor and transmission MT will now be explained.

To build a motor and transmission element MT, it is easiest to convert a hydraulic pump and to turn it into a hydraulic motor. Hydraulic pumps are well known components, which will not to be described in detail. Citation is made of the Fluid Power Reference Issue of Machine Design, volume 47, number 22, of Sep. 11, 1975, published by the Penton Publishing Co., of Cleveland, Ohio, USA, that is incorporated herewith by reference. Hydraulic pumps are covered in Section 1, which starts on page 7 and ends on page 22 inclusive. Best suited for the task are gear-on-gear type pumps, consisting of two identical gears in mesh with each other, inside a sealed housing. It should be noted that helical gear motors are also suitable for the task. The first gear of the hydraulic pump, named drive gear or driving gear, is driven by a drive shaft that is an extension of the driving gear. The second gear, called the driven gear, is rotated by the drive gear. Both the drive gear and the driven gear are enclosed in a housing having an oil inlet and an oil outlet. When the drive shaft is rotated by an external motor, oil supplied to the oil inlet enters the hydraulic pump and is swept around the periphery of the meshing gears towards the oil outlet, where it exits under pressure. The pair of gears of the pump, which carry the full power load of the pump, are supported by appropriate bearings. The housing of the pump and the driving shaft are sealed to withstand high pressures. Hydraulic pumps are manufactured with either spur gears or helical gears, but the spur gear configuration, which is preferred, is the most common.

It will now be explained how a hydraulic pump, which uses the rotational input of a motor to generate hydraulic pressure, may be converted to a hydraulic motor that generates rotational motion, when provided with hydraulic pressure. Starting with the hydraulic pump, the driven spur gear is replaced by a drive spur gear of the same size. As both gears are of the same size, the housing fits. However, the drive gear has a drive shaft that is an extension thereof and therefore, the housing must be modified to comprise appropriate bearing support and seals. For the sake of clarity, the bearings and the seals, all well known to the art, are not shown in the drawings.

The result obtained comprises a housing with an inlet port and an outlet port and a pair of drive gears, inside the housing, which both extend in drive shafts protruding to the outside of the housing. Now, when hydraulic pressure is supplied to the oil inlet, hydraulic fluid flows through the periphery of the spur gears to the oil outlet, rotating both gears simultaneously, and thereby also rotating both shafts. As both gear are in mesh, they counter-rotate and their corresponding shafts follow suit.

The hydraulic pump has thus been modified into a hydraulic motor with an inherent counter-rotating capability. Evidently, a gear-on-gear hydraulic motor may be transformed in the same manner, to provide the same results. FIG. 5 is a schematic rendering of the first embodiment 100, with a cross-section cut through the housing 10, The oil inlet and the oil outlet are deleted for the sake of clarity. Two spur gears 12 and 13 extend into, respectively, drive shafts 14 and 15 forming rotator shafts. In the same symmetric fashion, two arms 16 and 17 are fixedly coupled, respectively, to the drive or rotator shafts 14 and 15, by means well known to the art. The arms 16 and 17 are made to support fixedly, but releasably and adjustably, two weights, respectively, 18 and 19, again, by means well known to the art. As the connection between the weights 18 and 19 is adjustable, the weights, 18, 19, may be relocated along the length of the arms 16 and 17. These weights 18 and 19 may also be replaced by other weights, either heavier or lighter.

The parameters controlling the output of the vibration generation mechanism may be varied in different ways. First, by controlling the volumetric flow of oil supplied to the motor MT, which will proportionally alter the delivered rotational velocity. Therefore, the higher the flow rate, the higher the frequency of the vibrations. Second, the distance between each weight 18 and 19, and its respective drive or rotator shafts 14 and 15, and third, the mass of each one of the weights 18 and 19, mass which may be augmented or reduced.

Figure 6:
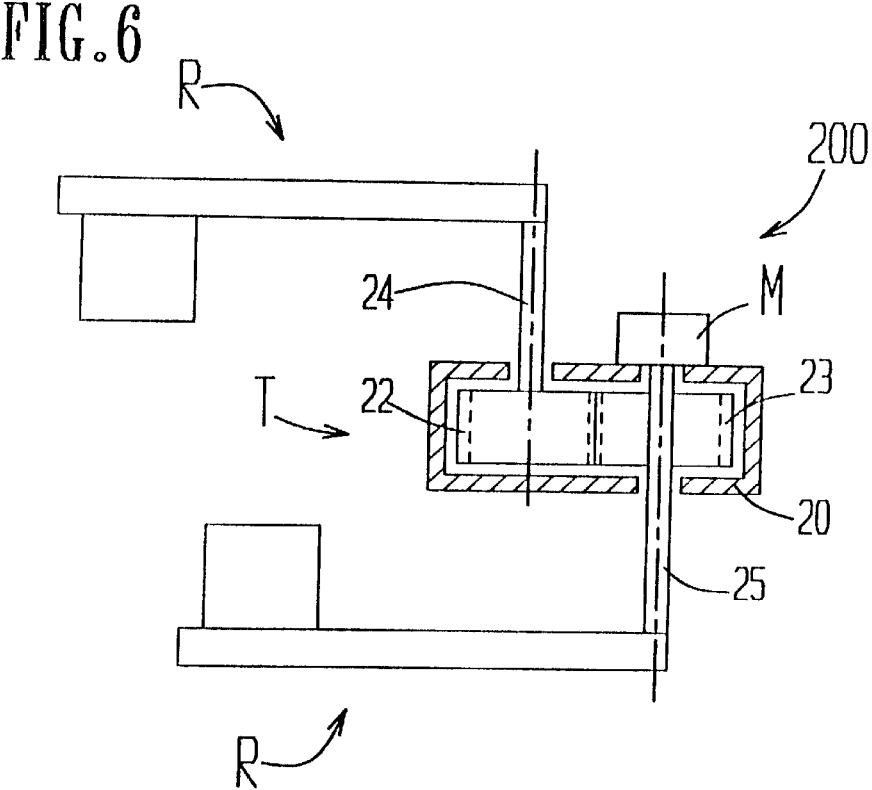
FIG. 6 depicts a second schematic embodiment of the vibration generation mechanism also in accordance with the elements of FIG. 4.

A second embodiment 200 of the vibration generation mechanism will be described with the help of FIG. 6. The three elements, namely, a motor M, a transmission T for generating counter-rotating motion, and a pair of eccentric rotators R are present, but as three separate entities. A motor M of any kind, but preferably a hydraulic motor, is mounted outside the housing 20 and is coupled to the transmission T. A pair of meshing gears 22 and 23, either helical gears or preferably spur gears, extend each, respectively, in rotator shafts 24 and 25. These gears 22 and 23 are supported by bearings and seals (not shown in FIG. 5) on the housing 20. It should be noted that the rotator shaft 25 is shown as being the output shaft of the motor M. Another option would be to couple the output shaft of the motor M to the rotator shaft 24. The two rotator shafts 24 and 25 are coupled to the two eccentric rotators R in the same manner as was described above for the embodiment 100. Still another option would be to provide for two motors M, one for each rotator shaft 24 and 25 respectively. The task of the meshing gears 22 and 23 is now only one of synchronizing both motors M and not anymore to carry loads.

In contrast with the first embodiment 100, the motor M of the second embodiment 200 is located outside of the housing 20, whereby it is easier to perform motor maintenance and to replace the motor M. In addition, the transmission mechanism T may be sealed inside the housing 20 awhile the single or pair of motors M remain outside the housing 20, for better cooling and ease of maintenance.

Figure 7:
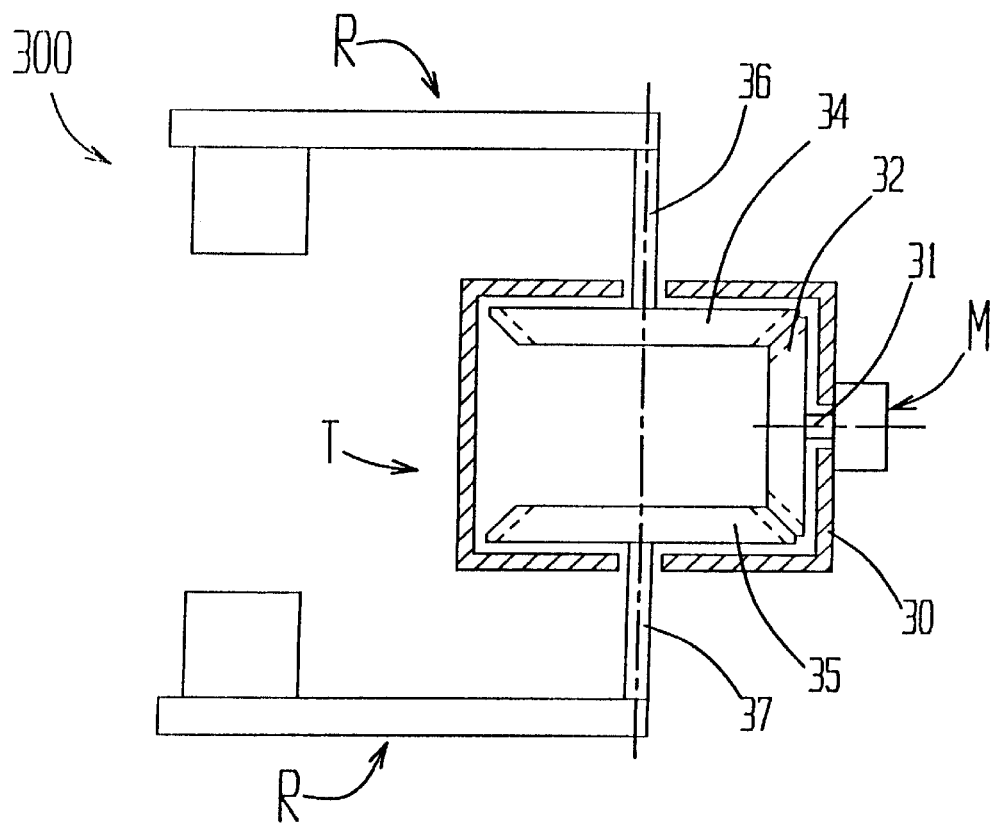
FIG. 7 illustrates a third schematic embodiment of the present invention, likewise based on FIG. 4.

A third embodiment 300 of the linear vibration generation mechanism is shown in FIG. 7. Here again, the three elements, motor M, transmission T and eccentric rotators R are separate elements, as opposed to the first embodiment 100.

A motor M, preferably a hydraulic motor, although other motors are suitable, is mounted on a housing 30. The output shaft 31 of the motor is coupled to a bevel gear drive pinion 32 and is supported by bearings (not shown in FIG. 7) on the housing 30. A pair of coaxial parallel bevel gears 34 and 35 mesh in parallel planes perpendicular with the plane of the drive pinion 32. Each one of the bevel gears 34 and 35 meshes on diametrically opposed sides of the drive pinion 32. The bevel gears 34 and 35 further extend in, respectively, aligned driven or rotator shafts 36 and 37. The rotator shafts 36 and 37 are each supported by bearings (not shown in FIG. 7) mounted on the housing 30. The output shaft 31 is perpendicular to the driven rotator shafts 36 and 37, but all the three shafts 31, 36 and 37 reside in the same horizontal plane.

Operation of the motor M rotates the output shaft 31, which drives the drive pinion 32. In turn, the pinion drive 32 rotates both coaxial parallel bevel gears 34 and 35, but those parallel bevel gears counter-rotate as they are both driven by the same pinion drive 32. As a result, the driven or rotator shafts 36 and 37 counter-rotate. Similar to the embodiment 200, the pair of eccentric rotators R is coupled to the driven or rotator shafts 36 and 37. Here too, a second motor M may be mounted on the housing 30, opposite to the first motor M. such an option calls for the addition of a second drive pinion 32, in opposite and in parallel with the first drive pinion 32. The two drive pinions 32 and the two bevel gears 34 and 35 would form a rectangle. Still another option allows the gears to only synchronize the rotation of the two motors M without carrying loads, by coupling each motor M to one of the pair of parallel bevel gears 34 and 35 instead of to the pinion gears 32. Evidently, a single pinion gears 32 would suffice for synchronization.

While preferred embodiments of the invention have been described shown and described in detail, it should be apparent that many modifications and variations thereto are possible, all of which fall within the true spirit and scope of the invention. For example, more than one motor may be used to provide for redundancy or greater output power. Also, other configurations are possible for the arms of the eccentric rotators, such being in the shape of a disk, of a sector, or in another shape.

It will be appreciated by persons skilled in the art that the present invention is not limited to what has been particularly shown and described above. Rather the scope of the present invention is defined only by the claims, which follow.

What is claimed is:

1. A linear vibration generation mechanism for a tree trunk shaker comprising a pair of clamps for locking on the trunk on opposite sides thereof, the mechanism comprising:
   at least one motor for providing rotational motion at a predetermined controllable angular velocity,
   a pair of identical eccentric rotators coupled to the at least one motor, the pair of eccentric rotators rotating in parallel planes and at the same angular velocity, each one rotator comprising a rotator shaft,
   an enclosure for containing the mechanism, the enclosure being an integral part of one clamp out of the pair of clamps, and
   the at least one motor being a hydraulic motor of the gear-on-gear type, with each one gear being coupled to one out of the pair of identical eccentric rotators by the rotor shaft, wherein the at least one hydraulic motor serves for provision and for transmission of rotational and counter-rotating motion.

2. The mechanism according to claim 1, wherein each one out of the pair of eccentric rotators further comprises:
   at least one weight, and
   an arm for releasably but fixedly supporting thereon the at least one weight in adjustable position.

3. The mechanism according to claim 2, the arm further comprising:
   accommodation for supporting of different at least one weight(s).

4. The mechanism according to the claim 3, the arm further comprising:
   accommodation for the adjustment of the position of the at least one weight to achieve different identical eccentricity of the pair of eccentric rotators.

5. The mechanism according to claim 3, wherein:
   the direction of linear vibration is defined by aligning the at least one weight of each one out of the pair of eccentric rotators in the desired direction of vibration.

6. The mechanism according to the claim 2, the arm further comprising:
   accommodation for the adjustment of the position of the at least one weight to achieve different identical eccentricity of the pair of eccentric rotators.

7. The mechanism according to claim 6, wherein:
   the direction of linear vibration is defined by aligning the at least one weight of each one out of the pair of eccentric rotators in the desired direction of vibration.

8. The mechanism according to claim 2, wherein:
   the direction of linear vibration is defined by aligning the at least one weight of each one out of the pair of eccentric rotators in the desired direction of vibration.

9. The mechanism according to claim 2, wherein:
   the direction of linear vibration is defined by aligning the at least one weight of each one out of the pair of eccentric rotators in the desired direction of vibration.

10. The mechanism according to claim 1 wherein the at least one hydraulic motor comprises:
    a conventional gear-on gear type oil pump, comprising:
       a housing having a first side in parallel and opposite to a second side, the housing also comprising a third side opposite to a fourth side, the first side being perpendicular to the third side, the housing being sealed close, and the housing defining an inside and an outside,
       a first drive gear,
       a driven gear of the same size as the first drive gear, the first drive gear and the driven gear meshing side-by-side in counter-rotation inside the housing,
       a first driving shaft coextensive and coaxial with the first drive gear the first driving shaft protruding outside of the first side of the housing in sealed engagement therewith,
       an oil inlet port located amid the third side, and
       an oil outlet port located amid the fourth side,
    the at least one hydraulic motor further comprising:
       the conventional gear-on-gear oil pump modified to comprise:
          a second driving shaft of the same size as the first driving shaft, the second driving shaft being coupled to the driven gear for operation as a second driving gear, and the second driving shaft protruding outside the second side of the housing in sealed engagement therewith, the first driving shaft and the second driving shaft being parallel to each other, whereby supply of oil under pressure to the oil inlet port rotates in mesh the first and the second drive gears in counter-rotation, thereby counter-rotating the first and the second driving shafts coupled to the rotator shaft of each one out of the pair of identical eccentric rotators.

11. The at least one hydraulic motor according to claim 10, wherein:

the gear-on gear type is selected from the group of types consisting of spur gears and of helical gears.

12. The mechanism according to claim 1, wherein:

the gear-on gear type is selected from the group of types consisting of spur gears and of helical gears.

13. The mechanism according to the claim 1, wherein:

the at least one motor further comprising comprises an output shaft, and a transmission is coupled to the output shaft of the at least one motor for transmission of motion, and the mechanism being characterized by the transmission further comprising:
- housing comprising a first side and a second side, the second side being opposite to and in parallel with the first side, the housing defining an inside and an outside, the first side outside supporting the at least one motor with the output shaft thereof entering inside the housing, through the first side and protruding outside of the second side,
- a first gear coupled inside the housing to the output shaft penetrating the housing and exiting therefrom to protrude outside the second side,
- a second gear of the same size as the first gear, the second gear and the first gear meshing side-by-side in counter-rotation inside the housing, and
- a driven shaft coextensive and coaxial with the second gear, the driven shaft exiting the housing to protrude outside the first side in parallel to the output shaft, the protruding end of each one of the output shaft and of the driven shaft being coupled to one out of the pair of identical eccentric rotators, and
- bearings accommodated in the housing to support the output shaft, the first gear, the second gear and the driven shaft whereby rotation of the at least one motor rotates the output shaft and counter-rotates the driven shaft, for transmission of motion and of counter-rotating motion to each one rotator shaft out of the pair of identical eccentric rotators.

14. The mechanism according to claim 13, wherein:

the at least one motor comprises a first motor having a first output shaft and a second motor having a second output shaft, the first motor rotating in a direction opposite to the second motor, and the housing further comprising:
- the first side outside supporting the first motor and the second side outside supporting the second motor,
- the first output shaft and the second output shaft penetrating from the side of their respective motor to inside the housing and protruding out of the opposite side outside, the first output shaft and the second output shaft being parallel, and
- the first gear and the second gear being coupled inside the housing, respectively, to the first output shaft and to the second output shaft, whereby the first gear and the second gear synchronize opposite rotation, of the first motor and of the second motor.

15. The mechanism according to the claim 13, wherein:

the housing is selected from the group consisting of an open housing, a closed housing and a sealed housing.

16. The mechanism according to claim 1, wherein:

the at least one motor further comprises an output shaft, and a transmission is coupled to the output shaft for transmission of motion, and the mechanism being characterized by the transmission further comprising:
- a housing of rectangular cross-section comprising a first side, a second side, a third side and a fourth side defining a housing inside and a housing outside, the first side and the second side being opposite and in parallel with, respectively, the third side and the fourth side, with the first side outside supporting the at least one motor with the output shaft thereof penetrating inside the housing,
- a drive pinion coupled to the output shaft inside the housing, the drive pinion being a bevel gear,
- a pair of coaxial parallel bevel gears meshing in perpendicular with the drive pinion, each one of the pair of bevel gears being rotatably supported inside the housing, respectively on the third side and on the fourth side,
- a pair of coaxial driven shafts with each one driven shaft out of the pair of coaxial driven shafts being coupled to each one out of the pair of parallel bevel gears, each one out of the pair of driven shafts protruding outside the housing and being coupled to one out of the pair of identical eccentric rotators, whereby rotation of the output shaft drives the parallel bevel gears in counter-rotation, thereby counter-rotating the pair of driven shafts for transmission of rotational motion and of counter-rotation to each one rotator shaft out of the pair of identical rotators.

17. The mechanism according to claim 16, wherein:

the at least one motor further comprises a first motor having a first output shaft and a second motor having a second output shaft, the first motor rotating in a direction opposite to the second motor, and the housing further comprising:
- the first side outside supporting the first motor and the second side outside supporting the second motor,
- the first output shaft and the second output shaft penetrating from the side of their respective motor to inside the housing,
- a first drive pinion and a second drive pinion located inside the housing and coupled respectively, to the first output shaft and to the second output shaft, the first drive pinion and a second drive pinion being a bevel gear,
- a pair of coaxial parallel bevel gears meshing in perpendicular with the first drive pinion and a second drive pinion, each one of the pair of bevel gears being rotatably supported inside the housing, respectively on the third side and on the fourth side, and
- a pair of coaxial driven shafts protruding outside the housing, each one out of the pair of coaxial driven shafts being coupled to each one out of the pair of parallel bevel gears, each one driven shaft being coupled to one out of the pair of identical rotators, whereby rotation of the output shafts drive the parallel bevel gears in counter-rotation, thereby counter-rotating the pair of driven shafts.

18. The mechanism according to claim 17, wherein:

the first drive pinion and a second drive pinion and the pair of coaxial parallel bevel gears synchronize rotation of the first motor and of the second motor.

19. The mechanism according to the claim 16, wherein:

the housing is selected from the group consisting of an open housing, a closed housing and a sealed housing.

* * * * *